United States Patent
Frenkiel et al.

(10) Patent No.: US 8,096,511 B2
(45) Date of Patent: Jan. 17, 2012

(54) SYSTEM FOR CONTROLLING THE DEPLOYMENT OF SPACECRAFT REQUIRED TO FLY IN FORMATION, BY SIMULTANEOUS AND HIGH-PRECISION DETERMINATION OF THEIR POSITIONS

(75) Inventors: Roland Frenkiel, Toulouse (FR); Thierry Dargent, Auribeau sur Siagne (FR)

(73) Assignee: Thales (FR)

( * ) Notice: Subject to any disclaimer, the term of this patent is extended or adjusted under 35 U.S.C. 154(b) by 473 days.

(21) Appl. No.: 12/293,694

(22) PCT Filed: Mar. 23, 2007

(86) PCT No.: PCT/EP2007/052756
§ 371 (c)(1),
(2), (4) Date: Feb. 18, 2009

(87) PCT Pub. No.: WO2007/107604
PCT Pub. Date: Sep. 27, 2007

(65) Prior Publication Data
US 2010/0032528 A1     Feb. 11, 2010

(30) Foreign Application Priority Data
Mar. 23, 2006   (EP) .................................. 06300275

(51) Int. Cl.
*B64G 1/10* (2006.01)
(52) U.S. Cl. .................................. 244/158.4; 244/158.8
(58) Field of Classification Search ............... 244/158.4, 244/158.5, 158.6, 158.8, 164
See application file for complete search history.

(56) References Cited

U.S. PATENT DOCUMENTS
4,375,697 A * 3/1983 Visher .......................... 455/13.1
(Continued)

FOREIGN PATENT DOCUMENTS
CA         2255127 A1 *    8/1999
(Continued)

OTHER PUBLICATIONS
The Consultative Committee for Space Data System: "Navagation Data Definitions and Conventions"; Green Book, (Online) No. 500. O-G-2, (Nov. 1, 2005), pp. 6-1-6-7, XP002393268; Washington, USA; URL:http://public.ccsds.org/publications/archive/500x0g2.pdf.*

(Continued)

*Primary Examiner* — Timothy D Collins
*Assistant Examiner* — Nicholas McFall
(74) *Attorney, Agent, or Firm* — Lowe Hauptman Ham & Berner, LLP

(57) ABSTRACT

A system is dedicated to the control of the deployment of at least two spacecraft (ES1, ES2) which are provided with maneuvering means (MD1, MD2) and are intended to move according to a chosen formation. This system includes a control device (MM11, MM12, MT, MC1) comprising i) first measurement means (MM11, MM12, MT) responsible for determining substantially simultaneously and with high precision the orbital positions of the spacecraft (ES1, ES2), and ii) first calculation means (MC1) responsible for determining for each of the spacecraft, as a function of their orbital positions, maneuvers intended to position each of them at a chosen instant substantially in a chosen position with respect to a reference trajectory, having regard to the time law of a reference craft (ES1) on this reference trajectory (TR), so as to place the formation in a chosen configuration.

16 Claims, 1 Drawing Sheet

U.S. PATENT DOCUMENTS 5,806,801 A * 9/1998 Steffy et al. .............. 244/158.6
5,979,830 A 11/1999 Kellermeier et al.
6,725,012 B1 4/2004 Janson et al.

FOREIGN PATENT DOCUMENTS

FR 2689855 10/1993

OTHER PUBLICATIONS

Budnik, F., T. A. Morley and R. A. Mackenzie, "Esoc's System for Interplanetary Orbit Determination", http://www.issfd.dIr.de/papers/P0118.pdf.

The Consultative Committee for Space Data System: "Navagation Data Definitions and Conventions"; Green Book, (Online) No. 500. O-G-2, (Nov. 1, 2005), p. 6-1-6-7, XP002393268; Washington, USA; URL:http://public.ccsds.org/publications/archive/500x0g2.pdf.

Deininger W D et al: "Formation Flying Activities and Capabilities at Ball Aerospace"; Aerospace Conference, 2003, Proceedings 2003 IEEE Mar. 8-15, 2003, Piscataway, NJ, USA, IEEE, vol. 6, (Mar. 8, 2003), pp. 62599-62614, XP010660555; ISBN: 0-7803-7651-X.

Eur Space Agency Spec Publ Esa Sp; Eurpean Space Agency, (Special Publication) Esa Sp; Proceedings of the 18th International Symposium on Space Flight Dynamics 2004, No. 548, 2004, pp. 189-194, XP009070403.

Vaillon et al: "Precision Formation Flying Design for the Smart-2 and Smart-3 Technology Demonstration Missions"; International Workshop on Satellite Constellations and Formation Flying, (Feb. 24, 2003), pp. 91-99, XP002320334.

* cited by examiner

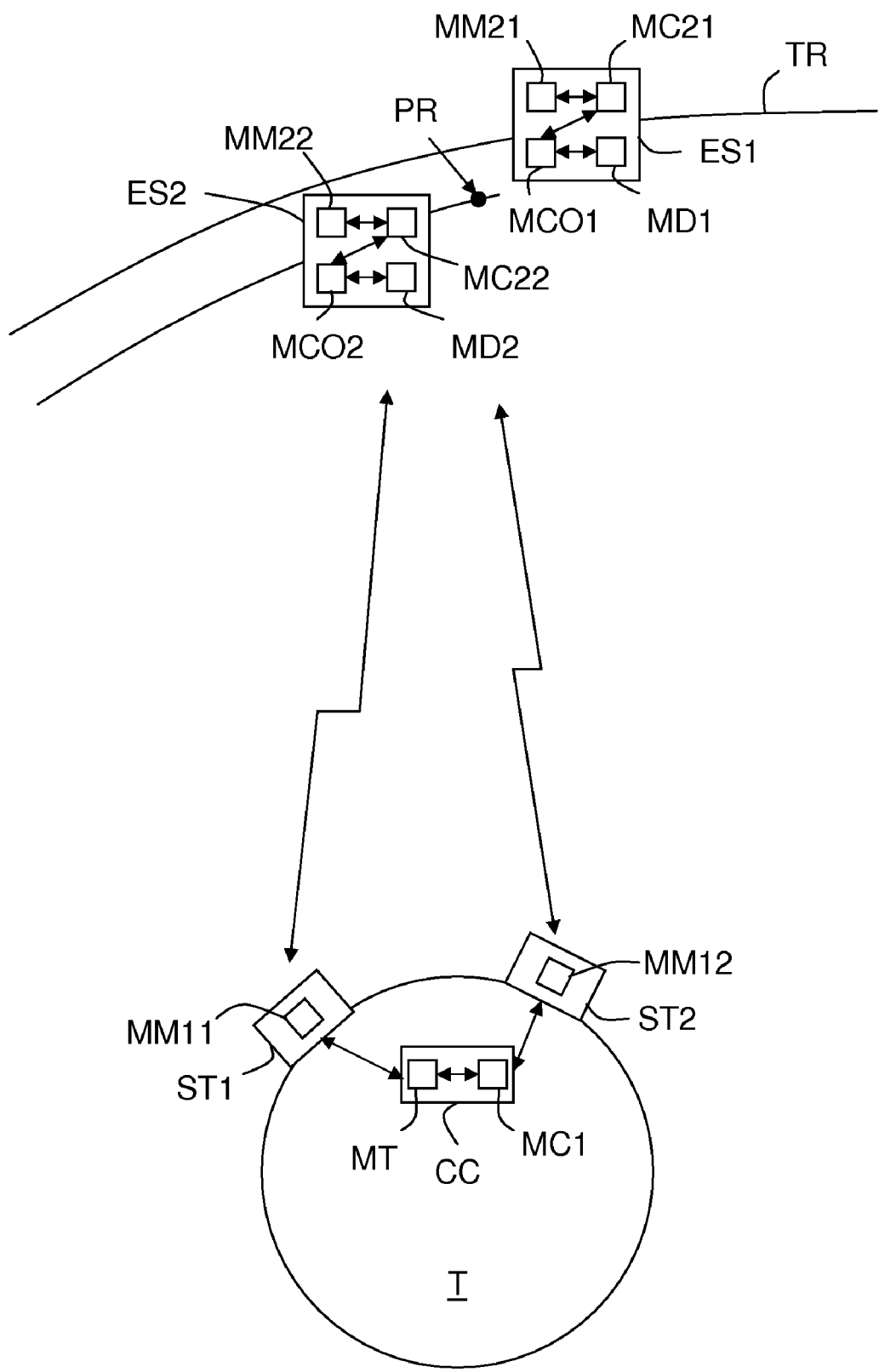
Single figure

SYSTEM FOR CONTROLLING THE DEPLOYMENT OF SPACECRAFT REQUIRED TO FLY IN FORMATION, BY SIMULTANEOUS AND HIGH-PRECISION DETERMINATION OF THEIR POSITIONS

CROSS-REFERENCE TO RELATED APPLICATIONS

The present Application is based on International Application No. PCT/EP2007/052756, filed on Mar. 22, 2007, which in turn corresponds to European Application No. 06300275.2 filed on Mar. 23, 2006, and priority is hereby claimed under 35 USC §119 based on these applications. Each of these applications are hereby incorporated by reference in their entirety into the present application.

FIELD OF THE INVENTION

The invention relates to spacecraft, such as for example satellites, intended to move in formation so as to collectively carry out a mission, and more precisely to the control of the deployment of such craft in space with a view to constructing a formation exhibiting a chosen configuration.

BACKGROUND OF THE INVENTION

In certain formation-flying missions, the distances separating the spacecraft (for example satellites (or "flyers")), after deployment, must be small, or indeed very small (for example about ten meters).

Deployment is initially planned in such a way as to bring all the spacecraft "into station" under dynamic conditions propitious to autonomous relative control. This deployment can be initiated by launching one or more composites, with one or more distinct launchers. Here the term "composite" implies a module temporarily transporting several spacecraft, comprising propulsion means, and from which the spacecraft separate as soon as the propulsion means are no longer useful. Deployment can also be done by directly releasing all the spacecraft on a transfer orbit.

These techniques for initiating deployment give rise at the very least to two common drawbacks: the inter-satellite distances may be such that visibility between satellites is not ensured, and the spacecraft may be made to "rendezvous" with final relative movements which may incur risks of collision. Here the term "rendezvous" implies the moment at which all the spacecraft lie inside a sphere, termed the rendezvous space, of diameter equal to the maximum range of the relative positioning metrology system, for example the inter-satellite radiofrequency (RF) link (defined by their onboard RF relative metrology means), i.e. typically 8 km for this example.

Today, no formation deployment technique has actually been implemented. Only the technique of positioning a spacecraft with respect to a heavenly body is well known and mastered. This consists in measuring, by means of a station installed on the ground, the successive positions of the spacecraft, and in determining, also on the ground, the maneuvers intended to position the craft with respect to the heavenly body as a function of the position measurements. These maneuvers are thereafter (tele-)transmitted to the spacecraft so that it performs them with the aid of onboard displacement means (nozzle(s) and/or actuator(s)).

Admittedly, a few deployment procedures have been proposed, but none of them takes into account the possibility of losing an inter-satellite RF link between launch and stationing (final position within the formation). Now, when launching by means of a single launcher, compliance with the RF range sphere (or rendezvous space) is not necessarily ensured. Additionally, the spacecraft do not necessarily have sufficient maneuvering capability to compensate for the force differentials which are exerted on each of them.

Moreover, when launching by means of several launchers, no consideration is ever given as regards placing elements of different types (composites and spacecraft) in communication. Now, this placing in communication necessarily requires recourse to an external means, because in this case the inter-satellite distances are much greater than the RF range. This external means can only be the station on the ground which is responsible for performing the position measurements, determines the maneuvers of the spacecraft and transmits these maneuvers by voice of waves in the form of trajectory corrections so as to slave them to their respective nominal trajectories while ensuring their rendezvous with a precision compatible with the RF range.

SUMMARY OF THE INVENTION

The aim of the invention is therefore to improve the situation.

Proposed for this purpose is a system dedicated to the control of the deployment of at least two spacecraft, which are provided with maneuvering means and are intended to move according to a chosen formation, and comprising a control device (optionally installed on the ground) comprising, on the one hand, first measurement means responsible for determining substantially simultaneously and with high precision the orbital positions of the spacecraft, and on the other hand, first calculation means responsible for determining for each of these spacecraft, as a function of their orbital positions, maneuvers intended to position each of them substantially at a chosen instant in a chosen position with respect to a reference trajectory, having regard to a time law of a reference craft on this reference trajectory, so as to place the formation in a chosen configuration.

The control system according to the invention can comprise other characteristics which can be taken separately or in combination, and notably:

- the reference craft is either one of the spacecraft of the formation (in this case the other spacecraft are called follower craft), or a dummy craft representative of the formation as a whole (for example placed at the barycenter of the latter);
- its first calculation means can be responsible for determining maneuvers intended to substantially position each craft at a chosen instant in a chosen position with respect to the reference trajectory and with a chosen relative speed (for example substantially zero) with respect to the reference craft, having regard to the time law of the latter on its reference trajectory;
- it can comprise, on the one hand, second means of relative metrology, for example of radiofrequency type (RF), installed on each of the craft and responsible for performing at least measurements of position of their own craft in relation to some at least of the other spacecraft, when the latter are placed in a so-called rendezvous space, and on the other hand, second calculation means installed on each of the craft and responsible for estimating the risks of collision with some at least of the other spacecraft on the basis at least of the measurements of relative position, and, in the event of risk of collision exceeding a chosen value, for determining the local and fleeting avoidance maneuvers to be undertaken;

the second means of relative metrology can be responsible for performing at least measurements, as well as optionally estimations, of relative speed of their spacecraft with respect to some at least of the other spacecraft. In this case, the second calculation means are responsible for estimating the risks of collision with some at least of the other spacecraft on the basis at least of the measurements of relative position and/or of the measurements or estimations of relative speed;

the second means of relative metrology and the second calculation means can be put into operation at the latest during the separation of their respective craft with respect to a launcher;

its first measurement means can comprise at least two measurement stations installed on the ground at chosen spots and each responsible for measuring substantially simultaneously at least the distances which separate them from the various spacecraft, as well as processing means responsible for determining the orbital positions of the spacecraft on the basis at least of the substantially simultaneous distance measurements;

its first measurement means can be responsible for determining the orbital positions of the spacecraft by means of the technique termed "Delta DOR" (for "Delta Differential One way Range").

The invention also proposes a control device intended to form part of a deployment control system of the type of that presented above.

The invention also proposes a spacecraft (such as for example a satellite), intended to move in formation within a group of spacecraft of the same type, and comprising maneuvering means, and second means of relative metrology and second calculation means of a deployment control system of the type of that presented above.

BRIEF DESCRIPTION OF THE DRAWINGS

Other characteristics and advantages of the invention will become apparent on examining the detailed description hereinbelow, and the appended drawing, in which the single FIGURE illustrates in a very schematic manner an exemplary deployment of two spacecraft by means of a control system according to the invention. The appended drawing will be able not only to serve to supplement the invention, but also to contribute to its definition, if appropriate.

DETAILED DESCRIPTION OF THE INVENTION

The object of the invention is to allow control of the deployment of spacecraft in space with a view to constructing a formation exhibiting a chosen configuration.

In what follows, it is considered, by way of illustrative and nonlimiting example, that the spacecraft are observation satellites (optionally of "flyer" type) flying (or intended to fly) in formation so as to fulfill an earth or space observation mission.

But, the invention is not limited to this type of spacecraft. It relates indeed to all spacecraft intended to fly in formation according to a chosen configuration (optionally modifiable).

The invention intervenes once the (space)craft have been separated from their launcher(s), as well as optionally from one or more composites (or transport module(s) with autonomous propulsion means).

The invention proposes a system intended to control the deployment of at least two spacecraft ESi provided with maneuvering means MDi and intended to move according to a chosen formation. Here the term "deployment" implies the phase making it possible to position spacecraft ESi with respect to one another so as to construct a formation exhibiting a chosen configuration (or geometry), in an enduring (although modifiable) manner.

In the example illustrated in the single FIGURE only two spacecraft ES1 and ES2 (i=1 and 2) have been represented, intended to fly in formation. But, the invention is not limited to this number. It relates indeed to any number of spacecraft if this number is greater than or equal to two (2).

A deployment control system according to the invention comprises at least one control device installed on the ground and comprising first measurement means MM1j and MT and a first calculation module MC1.

In what follows it is considered, by way of illustrative and nonlimiting example, that the control device is installed on the ground. But this is not compulsory. It is indeed possible to envisage that location be effected with respect to a constellation of satellites in flight (for example). The control device is then installed in satellites of the constellation which possess synchronized clocks.

The first measurement means MM1j and MT are responsible for determining substantially simultaneously and with high precision the orbital positions of the spacecraft ESi which are in the deployment phase (notably during the so-called cruising sub-phase which must bring them inside a rendezvous space). Here the term "rendezvous space" implies a sphere of diameter substantially equal to the radiofrequency range (RF) between two spacecraft. This range is currently about 8 km.

Here the term high precision implies a precision typically of the order of (or less than) a few tens, or indeed a few hundreds, of meters for a distance of about a million kilometers.

To achieve this type of precision, it is for example possible to use the technique termed Delta DOR (for "Delta Differential One way Range"), developed by the ESOC and the JPL and for example described in an article accessible at the Internet address http://www.issfd.dlr.de/papers/P0118.pdf).

Such a technique makes it possible to obtain a precision of about 25 m for a distance of about 1.5 million kilometers (this corresponding to the Lagrange 2 (or L2) point with respect to the Earth). The implementation of this technique requires at least two measurement stations installed on the ground STj (here j=1 and 2), for example on the Earth, and a processing module MT coupled to the stations STj.

Any other technique, known to the person skilled in the art, for determining orbital position, relying on the observation of craft by remote measurement means, that are oriented differently and synchronous, can be used.

Each (measurement) station STj comprises a first measurement module MM1j capable of emitting signals (for example radiofrequency (RF) signals—RF serves both for metrology and for communication links) destined for the spacecraft ESi, of collecting the signals reflected and of deducing therefrom substantially simultaneously the distances (range measurements) which separate it from the various spacecraft ESi, as well as preferably the radial speeds (for example by Doppler measurements) of the spacecraft ESi. The simultaneity of the measurements performed by the stations STj on the spacecraft ESi makes it possible to circumvent errors in the absolute measurement that is common to all the craft.

The processing module MT is responsible for determining the orbital positions of the various spacecraft ESi on the basis of the distance measurements, and optional measurements of radial speed, that are simultaneous (to the precision of the synchronized clocks of the ground stations STj) performed by the first measurement modules MM1j of the stations STj. The orbital positions are for example determined by means of a recursive filtering over time of the set of position/speed measurements, of Kalman filtering type, based on a model for predicting the trajectories of the spacecraft ESi that is provided by orbital mechanics and the model of the measurements performed by the ground stations STj.

As illustrated in the single FIGURE, the processing module MT can for example be installed in a calculation center CC separated physically from the stations STj. But, as a variant, it can be installed in one of the stations STj.

The first calculation module MC1, of the control system, is responsible for determining the maneuvers (or maneuvering plans) of each spacecraft ESi as a function of the orbital positions determined simultaneously by the first measurement means MM1j and MT. More precisely, the first calculation module MC1 determines for each spacecraft ESi the maneuvers intended to position it at a chosen instant substantially in a chosen position (or rendezvous point) PR with respect to a reference trajectory TR, having regard to the time law of a reference craft on this reference trajectory TR.

Here the term "time law" implies the law which governs the movement of the reference craft on its reference trajectory TR, and therefore which makes it possible to ascertain at each instant its theoretical position (as well as optionally its vector speed) with respect to this reference trajectory TR.

Furthermore, here the term "maneuvers" implies one or more commands (tele-)transmitted from the ground to a spacecraft ESi and intended to correct its current trajectory so that it steers towards the rendezvous.

As illustrated in the FIGURE, the reference craft is for example one (ES1) of the spacecraft of the formation. In this case, the other spacecraft ES2 are called follower craft. The first calculation module MC1 then determines firstly the maneuvers intended to position the reference craft ES1, substantially on a chosen reference trajectory TR. Then, for each follower craft ES2, it determines the maneuvers intended to position it at a chosen instant substantially in a chosen position (or rendezvous point) PR with respect to the reference trajectory TR, having regard to the time law of the reference craft ES1 on its reference trajectory TR.

But, in a variant, the reference craft can be a dummy craft which represents the formation as a whole. For example this dummy craft is placed at the barycenter of the formation and its trajectory is the reference trajectory TR. In this case, all the spacecraft ESi of the formation are follower craft. The first calculation module MC1 then determines firstly the reference trajectory TR of the dummy (reference) craft. Then, for each spacecraft ES1, ES2, it determines the maneuvers intended to position it at a chosen instant substantially in a chosen position (or rendezvous point) PR with respect to the reference trajectory TR, having regard to the time law of the dummy (reference) craft on its reference trajectory TR.

It is considered in what follows, by way of illustrative and nonlimiting example, that the reference craft is the spacecraft ES1 of the formation.

It is important to note that to each follower craft ES2 there corresponds a chosen position PR which substantially constitutes its final position with respect to the reference craft ES1, and therefore within the chosen formation (to within any local and final corrections to which we shall return further on). The objective is therefore to determine for each follower craft ES2 a specific rendezvous point PR with respect to the follower craft ES1, having regard to its reference trajectory TR, then the maneuvers which will allow it to reach this rendezvous point PR. A rendezvous point PR is a point of a space with five dimensions defined for example by the first five orbital parameters (the sixth, for example the position on the orbit, being free).

By virtue of the "maneuvering plans" thus defined by the first calculation module MC1 for each of said spacecraft ESi it is possible to construct the formation according to a chosen configuration.

The first calculation module MC1 can for example be installed in the calculation center CC, as illustrated in the single FIGURE. But, as a variant, it can be installed in one of the stations STj.

The maneuvering plans are for example forwarded to the various spacecraft ESi by the calculation center CC (when it contains the first calculation module MC1 and has suitable transmission means) or else by one of the stations on the ground STj.

It will be noted that several successive maneuvering plans may possibly be necessary in order for a follower craft ES2 to be able to arrive at its specific rendezvous point PR. Consequently, the first measurement means MM1j can be configured to perform measurements of distances, as well as preferably of radial speeds, either periodically, or when instructed, for example by the first calculation module MC1.

Preferably, the maneuvers (or maneuvering plan) that the calculation module MC1 determines for a follower craft ES2 are intended to position it at a chosen instant not only substantially at the level of a chosen position (or rendezvous point) PR with respect to the reference trajectory TR, but also with a chosen relative speed with respect to the reference craft ES1. This relative speed is for example chosen substantially equal to zero (0), so as to freeze the formation in the chosen configuration.

This is done by taking into account the extrapolated time law, possibly corrected, of the reference craft ES1, that is to say the total estimation of the positions and speeds. The kalman filter estimates all at the same time, by virtue of an accumulation of measurements of distances as well as preferably of radial speeds over a given time horizon. The prediction also gives the future time law, with a bias which diverges with the time from the last measurement.

Conventionally, when a spacecraft ESi receives instructions from the ground which define the maneuvers which have been determined for it, it communicates them to an orbit correction module MCOi that it comprises. The latter, an integral part of the semi-autonomous onboard control software, better known by the acronym GNC (for "Guidance Navigation and Control"), is responsible for converting at each timestep of the GNC the maneuvering instructions received from the ground into force and/or torque, then for converting these force and/or torque into command(s) that it transmits to the maneuvering means MDi of its spacecraft ESi in a comprehensible form.

The maneuvering means MDi can be of any type. They may notably involve nozzle(s) and/or actuator(s), for example chemical ones, notably for impulse maneuvers, or plasmic ones, based on cold gas, electric or electromagnetic field emission, notably for maneuvers at continuous thrust.

It will be noted that as a variant the relative positions can be determined on the basis of the differentials of the measurements of each of the ground stations STj rather than by estimating the absolute positions of each of the spacecraft ESi. The covariance of this differential quantity being large, this makes it possible to improve the estimation precision, once entered into the constant data of the Kalman filter. The prediction model used can then be that for the differential disturbances between two given spacecraft ESi, assuming that the absolute position measurement for one of the spacecraft ESi, for example the reference craft, has been made previously.

The control system preferably contains, as a supplement to its control device installed on the ground (MM1j, MT, MC1), second means of relative metrology MM2i and second calculation modules MC2i installed at least in each of the follower craft ES2 (as well as optionally in the reference craft ES1).

The second means of relative metrology MM2i are responsible for performing at least sets of instantaneous measurements of relative position of the spacecraft ESi in which they are installed with respect to some at least of the other spacecraft ESi' when they are situated inside the rendezvous space, that is to say in radio range when the measurements are of radiofrequency (RF) type.

The second means of relative metrology MM2i can be of a type other than radiofrequency.

They can also and optionally perform relative speed measurements which supplement the sets of instantaneous measurements of relative positions and make it possible to determine more finely some at least of the relative positions of the other spacecraft ESi' with respect to their spacecraft ESi.

Each second calculation module MC2i is responsible for estimating the risks of collision of its spacecraft ESi with each other spacecraft ESi' (i≠i'), subject to measurements, on the basis at least of the measurements of relative position and optional measurements of relative speed performed by the associated second means of relative metrology MM2i. For example, the second calculation module MC2i delivers, for each spacecraft ESi' subject to measurements, a value representative of the probability that it collides with its spacecraft ESi. The second calculation module MC2i can then compare each probability value with a threshold value, and when a probability value is greater than the threshold value (that is to say in the event of a risk of collision) it determines local and fleeting avoidance maneuvers intended to allow its spacecraft ESi to avoid at least one other spacecraft ESi'.

In order to improve the precision of the collision risk estimations, the second means of relative metrology MM2i can also be responsible for performing estimations (prediction) of the relative positions and optionally of the relative vector speeds of their spacecraft ESi with respect to each other spacecraft ESi' subject to a distance and relative direction measurement. Accordingly, they can for example comprise a Kalman filter responsible for giving the positions and relative speeds from the start of the campaign of measurements up to the last measurement instant, that is to say the time law, thus making it possible to extrapolate their values into the future, on condition that the effect of the actuators and of the differential disturbances is known. It will be noted that the bias of the estimation into the future (extrapolation) increases with time. A priori no Kalman filter is used in backup mode, but this may be envisaged.

The second calculation module MC2i is responsible for estimating the risks of collision of its spacecraft ESi with each other spacecraft ESi' subject to measurements, on the basis of the measurements and/or estimations of relative position and optionally of the measurements and/or estimations of relative speed.

The second means of relative metrology MM2i and the second calculation module MC2i, which are installed at least in each follower craft ES2, constitute what the person skilled in the art generally calls an anticollision (or avoidance) device. Any type of anticollision (or avoidance) device known to the person skilled in the art can be used in a spacecraft ESi.

The avoidance maneuvers decided by a second calculation module MC2i preferably have priority over the maneuvers (or maneuvering plan) determined on the ground for its spacecraft ESi. Consequently, each time that a second calculation module MC2i decides that avoidance maneuvers must be performed by its spacecraft ESi, it communicates them to the associated orbit correction module MCOi (for example of GNC type). The latter converts them into trajectory correction command(s), then it transmits them to the maneuvering means MDi of its spacecraft ESi so that they execute them.

Preferably, the second means of relative metrology MM2i and the second calculation module MC2i, which are installed at least in each follower craft ES2, are designed so as to be able to be put into operation (or activated) at the latest when their spacecraft separates from the launcher or from the composite, if any, which momentarily transports them. Thus, each spacecraft ESi can form the subject of a collision detection right from the start of the deployment phase.

When a follower craft ES2 has arrived at its specific rendezvous point PR, it may happen that the reference craft ES1 has varied slightly from its reference trajectory TR and/or that it has not exactly followed its time law and/or that its relative speed with respect to the follower craft ES2 is not that chosen on the ground. In this case, the specific rendezvous point PR and/or the relative speed of the follower craft ES2 must be corrected. The measurements performed on the ground not being sufficiently precise, the second means of relative metrology MM2i and the second calculation module MC2i, which are installed in the spacecraft ESi, can then be responsible for positioning the latter precisely, having regard to the real position of the reference craft ES1. They are indeed capable of determining the relative position (and the relative speed) of their follower craft ES2 with respect to the reference craft ES1, then of comparing it (them) with the planned relative position (and/or the planned relative speed), and of determining the corrective maneuvers that must be performed by their follower craft ES2 so that it is correctly and precisely positioned with respect to the reference craft ES1, with the planned relative speed. This final correction can be made in a completely autonomous manner on board, but it is triggered either on request from the ground, or automatically once the follower craft ES2 has arrived at the rendezvous point PR initially determined by the ground.

The first MC1 and second MC2i calculation modules, the orbit correction modules MCOi and the processing module MT, can be embodied in the form of electronic circuits, software (or computer) modules, or a combination of circuits and software.

It will be noted that the invention makes it possible to reintegrate into a formation a (follower) spacecraft which has strayed from the reference craft by a distance greater than the radio range (typically 8 km).

Additionally, it will be noted that by choosing to define each rendezvous point with respect to the final orbit of the reference craft, the problems of control during the cruising (or transfer) sub-phase are circumvented, except for the optional (and preferential) implementation of an anti-collision function. This makes it possible to simplify the work of the orbit correction module (GNC) during this sub-phase and therefore to optimize consumption since it is reduced to the requirements related to navigation and to guidance.

The invention is not limited to the control system, control device and spacecraft embodiments described above, merely by way of example, but it encompasses all the variants that may be envisaged by the person skilled in the art within the scope of the claims hereinafter.

The foregoing described an implementation of the invention in which the first measurement means and the first calculation means of the control device are installed on the ground (in ground stations). But, the first measurement means and/or the first calculation means of the control device can be installed in satellites of a constellation in flight which possess synchronized clocks. For example, the first measurement means of the control device can be installed in the satellites of a constellation in flight, while the first calculation means of the control device are installed in a station on the ground. The locating of the spacecraft, which must be placed according to a chosen configuration, is then done with respect to the constellation of satellites in flight.

The invention claimed is:

1. A system for controlling deployment of at least two spacecrafts which are provided with maneuvering means and are configured to move according to a chosen formation, the system comprising:
   a control device comprising:
      a first measurement unit configured to determine substantially simultaneously orbital positions of said spacecrafts, and
      a first calculation unit configured to determine for each of said spacecrafts, as a function of said orbital positions, maneuvers for positioning each of said spacecrafts at a predetermined instant substantially in a predetermined position with respect to a reference trajectory of a reference craft, having regard to a time law of a reference craft on said reference trajectory, so as to place said spacecrafts in said formation;
   at least one second measurement unit installed on one of said spacecrafts and configured to perform a measurement of relative positions between the one of said spacecrafts and an object within a rendezvous space of the one of said spacecrafts; and
   at least one second calculation unit installed on the one of said spacecrafts and configured to estimate a risk of collision with the object within the rendezvous space on the basis at least of said measurement of relative positions and, after the risk of collision exceeding a predetermined threshold value, to determine avoidance maneuvers.

2. The system as claimed in claim 1, wherein said reference craft is one of said spacecrafts, and another one of said spacecrafts being a follower craft.

3. The system as claimed in claim 2, wherein said first calculation unit is configured to determine maneuvers applicable to substantially position each craft at a chosen instant in a chosen position with respect to said reference trajectory and with a chosen relative speed with respect to said reference craft, having regard to said time law of said reference craft on its reference trajectory.

4. The system as claimed in claim 1, said reference craft is a dummy craft representative of the said spacecrafts in said formation as a whole.

5. The system as claimed in claim 4, wherein said first calculation unit is configured to determine maneuvers applicable to substantially position each craft at a chosen instant in a chosen position with respect to said reference trajectory and with a chosen relative speed with respect to said reference craft, having regard to said time law of said reference craft on its reference trajectory.

6. The system as claimed in claim 1, wherein said first calculation unit is configured to determine maneuvers applicable to substantially position each craft at a chosen instant in a chosen position with respect to said reference trajectory and with a chosen relative speed with respect to said reference craft, having regard to said time law of said reference craft on its reference trajectory.

7. The system as claimed in claim 6, wherein said first calculation unit is configured to determine maneuvers applicable to substantially position each craft with a substantially zero relative speed with respect to said reference craft.

8. The system as claimed in claim 1, said second measurement unit is configured to estimate relative speed between the one of said spacecrafts with respect to another one of said spacecrafts, and said second calculation unit is configured to estimate a risk of collision with the another one of said spacecrafts on the basis at least of said measurements of relative positions and of said relative speed.

9. The system as claimed in claim 1, wherein said second measurement unit and said second calculation unit are suitable for being put into operation at the latest during separation of the one of said spacecrafts with respect to a launcher.

10. The system as claimed in claim 1, wherein said first measurement unit comprises:
    at least two measurement stations installed on the ground at predetermined spots and each configured to measure substantially simultaneously at least the distances from the measurement stations to said spacecrafts; and
    a processing unit configured to determine said orbital positions of said spacecrafts on the basis at least of said substantially simultaneous distance measurements.

11. The system as claimed in claim 1, wherein said first measurement unit is configured to determine said orbital positions of the spacecrafts by a Delta Differential One way Range (DOR) technique.

12. The system as claimed in claim 1, wherein said control device is installed on the ground.

13. A spacecraft, comprising:
    a maneuvering unit configured to move the spacecraft in a predetermined formation with at least another spacecraft of the same type in response to maneuver instructions from a control device;
    a measurement unit installed on the spacecraft and configured to perform a measurement of relative positions between the spacecraft and the another spacecraft during a period that the spacecraft and the another spacecraft are within a rendezvous space; and
    a calculation unit installed on the spacecraft and configured to estimate a risk of collision with the another spacecraft within the rendezvous space on the basis at least of said measurement of relative positions and, after the risk of collision exceeding a predetermined threshold value, to determine avoidance maneuvers.

14. The spacecraft as claimed in claim 13, wherein the spacecraft is devised in the form of a satellite.

15. The system as claimed in claim 13, said measurement unit is configured to estimate relative speed between the spacecraft with respect to the another spacecraft, and said calculation unit is configured to estimate a risk of collision with the another spacecraft on the basis at least of said measurements of relative positions and of said relative speed.

16. The system as claimed in claim 13, wherein said measurement unit and said calculation unit are suitable for being put into operation at the latest during separation of the spacecraft with respect to a launcher.

* * * * *